United States Patent
Allen et al.

(10) Patent No.: US 9,243,895 B2
(45) Date of Patent: Jan. 26, 2016

(54) REMOTE DISPLACEMENT SENSOR, INCLUDING AN OPTICAL STRAIN GAUGE, AN ASSEMBLY AND SYSTEM THEREWITH

(75) Inventors: Roy D. Allen, North Andover, MA (US); Mark A. Ritter, Sharon, MA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 901 days.

(21) Appl. No.: 13/496,588

(22) PCT Filed: Sep. 15, 2010

(86) PCT No.: PCT/US2010/048921
§ 371 (c)(1), (2), (4) Date: Mar. 16, 2012

(87) PCT Pub. No.: WO2011/034910
PCT Pub. Date: Mar. 24, 2011

(65) Prior Publication Data
US 2012/0176629 A1 Jul. 12, 2012

Related U.S. Application Data

(60) Provisional application No. 61/243,749, filed on Sep. 18, 2009.

(51) Int. Cl.
*G01B 11/14* (2006.01)
*G01D 5/347* (2006.01)
*G01D 5/38* (2006.01)

(52) U.S. Cl.
CPC ............ *G01B 11/14* (2013.01); *G01D 5/34746* (2013.01); *G01D 5/38* (2013.01)

(58) Field of Classification Search
CPC ... G03F 9/7003; G03F 9/7076; G01B 11/165; G01B 11/161

USPC ............... 356/605–620, 32, 521, 486, 239.2; 382/218, 275, 100, 143, 243, 132
See application file for complete search history.

(56) References Cited

U.S. PATENT DOCUMENTS

| | | | |
|---|---|---|---|
| 2,787,834 | A | 4/1957 | Shoup |
| 3,496,374 | A | 2/1970 | Burr et al. |

(Continued)

FOREIGN PATENT DOCUMENTS

| | | |
|---|---|---|
| DE | 31 20 653 | 12/1982 |
| DE | 3120653 A1 | 12/1982 |

(Continued)

OTHER PUBLICATIONS

ISR for PCT/US2010/048921 filed May 26, 2011.

*Primary Examiner* — Kara E Geisel
*Assistant Examiner* — Iyabo S Alli
(74) *Attorney, Agent, or Firm* — McCarter & English, LLP

(57) ABSTRACT

The disclosure relates to a remote displacement sensor, such as an optical strain gauge, which uses an optical amplifier implemented by patterns, such as, moiré patterns, to calculate changes in position. In a strain gauge with moiré patterns, two foil layers are provided, a lower foil layer with a reference or static moiré pattern generated by the overlaying of a first pattern with parallel lines at a first fundamental frequency and a second pattern with parallel lines at a second fundamental frequency. The lower foil layer further includes a first section with a first pattern with parallel lines at the first fundamental frequency while the upper layer provides a second section with a second pattern with parallel lines at the second fundamental frequency. The overlaying of the foils causes an overlying of the first and second sections thereby causing a moiré pattern of the same wavelength as the reference pattern.

28 Claims, 10 Drawing Sheets

Strain Sensor Concept

- Sensor consists of two superimposed sliding foils (partially offset for illustration only)
- Bottom foil has both a fundamental pattern and reference interference pattern
- Top foil has a 2nd fundamental pattern to create a moving interference pattern for position measurement

(56) References Cited

U.S. PATENT DOCUMENTS

| | | |
|---|---|---|
| 3,802,781 A | 4/1974 | Wright |
| 5,969,342 A | 10/1999 | Feng et al. |
| 6,022,154 A | 2/2000 | Allen |
| 6,075,893 A * | 6/2000 | Brandstetter ............ G01D 5/38 355/605 |
| 6,150,231 A * | 11/2000 | Muller ................ G03F 7/70633 438/401 |
| 6,164,847 A | 12/2000 | Allen |
| 6,285,023 B1 | 9/2001 | Uehira |
| 7,047,819 B2 | 5/2006 | Hayford et al. |
| 7,477,362 B2 * | 1/2009 | Asundi et al. ................. 356/521 |
| 7,485,845 B2 | 2/2009 | Yaku et al. |

FOREIGN PATENT DOCUMENTS

| | | |
|---|---|---|
| DE | 102 46 408 | 5/2003 |
| EP | 0 255 300 | 2/1988 |
| EP | 0255300 A2 | 2/1988 |
| GB | 1 012 283 | 12/1965 |
| GB | 2 197 466 | 5/1988 |
| JP | 2009069033 A | 4/2009 |

* cited by examiner

Vertical average intensity waveform of a fringe segment

Intensity waveforms for active and reference fringe segments

FIG. 10

Fixed segment of successive video frames showing effects of rigid body and strain displacements on OSG Portion of video frame #1 showing OSG: Ref. fringe (Top) & Active (Bottom)

FIG. 12A

Plot of mean intensity for Reference and Active segments

FIG. 12B

Portion of video frame #2 showing OSG: Ref. fringe (Top) & Active (Bottom)

FIG. 13A

Plot of mean intensity for Reference and Active segments

REMOTE DISPLACEMENT SENSOR, INCLUDING AN OPTICAL STRAIN GAUGE, AN ASSEMBLY AND SYSTEM THEREWITH

This application is national phase of PCT/US2010/048921 filed Sep. 15, 2010, and claims priority under 35 U.S.C. §119(e) of U.S. provisional application Ser. No. 61/243,749 filed Sep. 18, 2009.

BACKGROUND OF THE DISCLOSURE

1. Field of the Disclosure

The present disclosure relates generally to a remote displacement sensor with many applications. In particular, one application is a strain measuring device used in materials testing. More specifically, the present disclosure relates to the use of visual or optical patterns, including but not limited to moiré patterns, which change in appearance in response to changes in position, and to the methods for detecting and interpreting these changes.

2. Description of the Prior Art

In the prior art, strain measuring devices are well known. Instron, a subsidiary of Illinois Tool Works Inc., makes and sells, among other things, various strain measuring devices. In the past, compressive and tensile properties of materials have been measured by clip-on extensometers that use a resistive strain gauge and, more recently, by non-contact video extensometers. While well-adapted to their intended purposes, clip-on extensometers typically require extensive set-up by trained personnel. Similarly, video extensometers, while well-adapted for their intended purposes, are sensitive to camera motion, air currents, quality of focus and dynamic variations, z-direction motion of the specimen, and displacement of the specimen during gripping, all of which can require compensation to avoid the introduction of errors. Video extensometer applications often require that the centroid of the target dot be measured to an accuracy that represents a small fraction of a camera pixel, thereby requiring sophisticated image processing to achieve necessary sub-pixel accuracy.

Prior art includes U.S. Pat. No. 7,047,819 entitled "Testing of Samples" by Haywood; U.S. Pat. No. 6,164,847 entitled "Image Parameter Detection" to Roy Allen (the present inventor); U.S. Pat. No. 2,787,834 entitled "Grating Strain Gauges" to Shoup; DE 3120653 and EP 0255300.

OBJECTS AND SUMMARY OF THE DISCLOSURE

It is therefore an object of the present disclosure to provide a remote displacement sensor, such as, but not limited to, an extensometer, which can provide accurate results, while minimizing extensive specialized set-up.

More specifically, it is an object of the present disclosure to provide such a remote displacement sensor which is insensitive to environmentally induced errors, accurate at a large working distance (providing in some embodiments a working distance as great as ten million times the measurement accuracy required), and can be implemented at a relatively low cost.

These and other objects are obtained by providing a remote displacement sensor, which may be implanted as an optical strain gauge with two overlapping or overlaid layers of substrate, such as, but not limited to, film. Many different visual patterns may be implemented with different embodiments. In a typical embodiment of an optical strain gauge of the present disclosure, the bottom layer includes a reference moiré pattern adjacent to a first pattern with a first series of parallel lines at a first spacing. The top layer includes a second pattern with a second series of parallel lines at a second spacing. The first and second patterns overlie each other, and the combination of the two patterns (with two different spacings of the parallel lines, at first and second fundamental frequencies of a moiré pattern) results in a moiré pattern with an intensity which varies spatially in a sinusoidal-like pattern with a constant wavelength. A first end of the bottom layer is attached to the specimen and second end (opposite to the first end) of the top layer is attached to the specimen so that as the specimen is subjected to strain, the top layer slides along the bottom layer and changes the spatial phase of the sinusoidal-like moiré pattern which is generated by the overlaid first and second patterns. An optical gain is achieved in that the spatial phase (i.e., the translation of the waveform due to phase change), expressed in linear dimension, moves faster than the change in relative displacement caused by the strain. An optical gain factor of twenty is an example of what can be achieved with some embodiments of the present disclosure. The resulting moiré pattern and the reference moiré pattern are scanned by an optical sensor and analyzed by an algorithm, such as, but not limited to, a Fast Fourier Transform (FFT) algorithm for determining the change in spatial phase, thereby determining the change in relative displacement, thereby enabling a calculation of change of gauge length, and hence, the strain on the sample during tensile or similar testing.

The embodiments of the present disclosure produce a combined visual effect using overlapping component patterns which may be pseudo-random or periodic in nature. Typically, one of the component patterns has a parameter such as intensity, phase, distribution of elements, color, or other parameter, that is periodically modulated. Combining the component patterns is intended to produce a low spatial frequency visual effect suitable for remote viewing at a distance; a visual pattern that changes in proportion to differential motion between the component foil patterns; and a visual effect that has gain such that the position dependent changes amplify the relative motions between the component foil patterns.

Further, embodiments of the present disclosure may have the following advantages. Firstly, working distance to measurement resolution ratios may typically be as great as ten million to one. Secondly, the remote camera alignment and position stability is typically non-critical, orders of magnitude less restrictive than an encoder read head which typically has alignment tolerances on the order of hundreds of microns. Thirdly, high accuracy, as much as 0.5 microns, can typically be achieved with simple photographic film gratings having 280 micron features (or similar). Fourthly, due to the low cost of the typical embodiment of the present disclosure, the sensors typically may be considered to be "disposable" or "single use". Fifthly, in some applications, the video read head can interpret multiple foil sensors simultaneously in the same field-of-view, with no requirement that the foil sensors be oriented along the same measurement axis.

The high signal-to-noise ratio of embodiments of this disclosure, as compared to the prior art, is accomplished typically because of two factors. Firstly, embodiments of this disclosure employ a phase-based measurement of an array of objects covering a substantial area rather than an intensity centroid-based measurement of a few individual marks placed on the specimen. Such discrete marks typically require consistent high image contrast in order to be identified and to find the centroid of the mark. The mark centroid is driven primarily by the perimeter pixels of the mark which further reduces the amount of position sample data that an individual mark or dot can provide. Embodiments of the present disclosure, on the other hand, typically utilize the mean phase of an array of repeating objects to make a measurement. Furthermore, because embodiments of the present disclosure compare relative phase differences between two similar arrays of objects known to be rigidly coupled, the phase difference can be tracked independently of camera orientation. Therefore, the effective size and shape of the array, as seen by the camera, can change during the course of the test.

In summary, embodiments of the present disclosure enable dynamic moiré fringe patterns to be remotely calibrated at great distances without regard to camera orientation and with very low camera pixel resolution. A known reference pattern may be placed in close proximity to the moiré variable phase pattern. The reference pattern is typically similar in pitch and intensity profile as the combined moiré interference pattern. This allows a direct comparison of the relative phase shift between two patterns implemented in the local coordinate space of the object under test, rather than relying on the calibrated pixel space of a distant camera to track the phase shift of just the dynamic moiré pattern alone. In addition, the displacement measurement is actually made at the sensor by virtue of the local moiré interference rather than being made in a globally calibrated camera pixel space. This typically eliminates or greatly reduces the requirement for a continuously stable optical environment between the sensing element and the remote camera as well as the need to maintain a rigidly coupled, calibrated pixel space. Further embodiments of this local reference method may be applied to other phase-sensitive interference patterns or effects that can be made visible to a remote camera. This includes interference modes in which pseudo-random noise patterns with structured phase modulation interfere to produce a phase dependent pattern change.

BRIEF DESCRIPTION OF THE DRAWINGS

Further objects and advantages of the invention will become apparent from the following description and from the accompanying drawing, wherein.

DETAILED DESCRIPTION OF THE PREFERRED EMBODIMENTS

Figure 1:
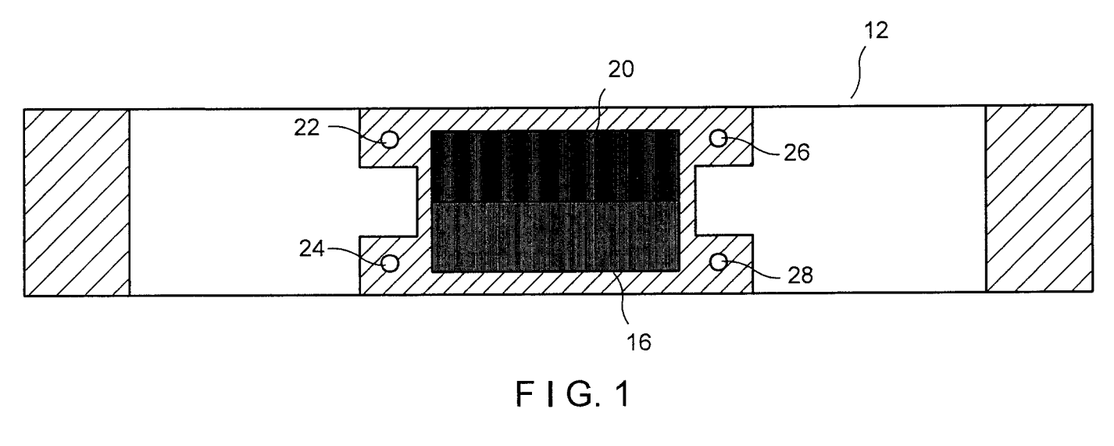
FIG. 1 is a plan view of the bottom layer of the remote displacement sensor of the present disclosure, implemented as an optical strain gauge.
Figure 2:
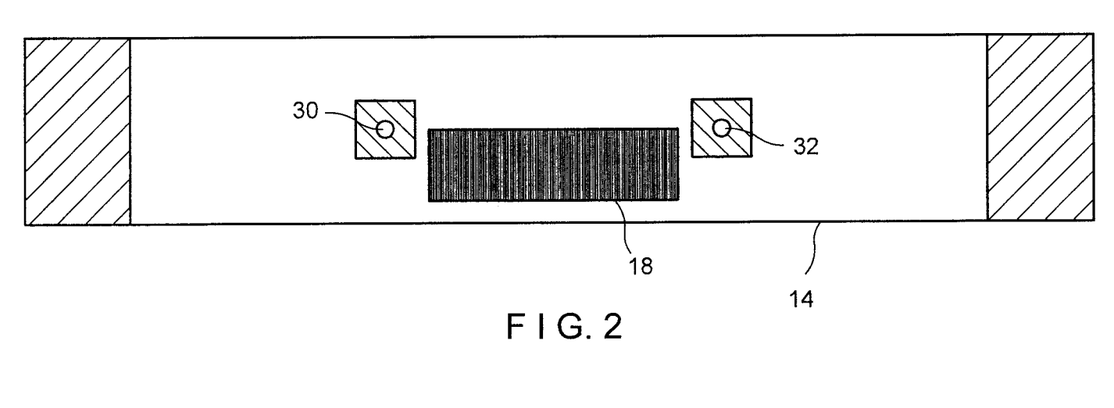
FIG. 2 is a plan view of the top layer of the optical strain gauge of the present disclosure.

Referring now to the drawings in detail wherein like numerals indicate like elements throughout the several views, one sees that FIGS. 1-4 illustrate the structure of the strain gauge 10 which is one embodiment of a remote displacement sensor of the present disclosure. FIGS. 1 and 2 illustrate the bottom layer 12 and top layer 14, respectively. The bottom and top layers 12, 14 are typically thin, flexible transparent foils with patterns printed thereon, but other substrates, including rigid substrates, could also be used. The patterns are typically printed on the foils at 2540 dots per inch (10 micrometers per pixel) using established imagesetter technology, or any other suitable method which may vary with the scale or size of the application. Bottom layer 12 includes a first pattern area 16 with parallel lines spaced at a first fundamental frequency of a moiré pattern, while top layer 14 includes a second pattern area 18 with parallel lines spaced at a second fundamental frequency of a moiré pattern. A non-limiting example of the first and second pattern areas 16, 18 is lines spaced at 0.20 mm and 0.21 mm respectively. When the top layer 14 is placed over the bottom layer 12 in the configuration shown in FIG. 4, this results in a moiré pattern of (approximate) sinusoidal intensity (which may be characterized as a modulated intensity) with a wavelength of 4.2 mm. Additionally, when the bottom and top layers 12, 14 are displaced axially, relative to each other (i.e., movement perpendicular to the direction of the parallel lines of first and second pattern areas 16, 18), the spatial phase (i.e., the translation of the waveform, expressed in linear dimension, due to phase change) of the resulting moiré pattern changes by 20 times the relative displacements, thereby resulting in an optical gain. Other optical amplifications may be achieved by different spacings of the parallel lines of first and second patterns areas 16, 18.

Additionally, there are other methods of producing an interference effect (i.e., a pattern of modulated intensity) between the bottom and top layers 12, 14 other than moiré patterns. Preferably, the patterns used for producing an interference fringe pattern or visual effect should provide an effect that matches a specific remote camera pixel size and field-of-view setting (be clearly resolvable in the given camera pixel space); provide a designated target gain; provide a designated target number of fringe cycles over the length of the sensor; and be implemented within the small physical scale of the sensor foils. However, binary modulated line patterns printed at a practical 2540 dots per inch addressability sometimes will not provide all of the above criteria. Therefore, pseudo-random noise modulation may be chosen to provide fine tuning of fringe pitch and gain; improved signal-to-noise ratios; and smoother, more sinusoidal fringes generated by appropriately modulated binary patterns. Therefore, pseudo-random patterns (having no regular spacing) into which information is encoded by modulating some aspect of the pattern (such as size or spacing of a random array of dots) such that a low spatial frequency, position-sensitive interference effect is generated when the two patterns are overlaid. In general form, the inherent order in each fundamental pattern does not have to comprised of a repeating shape with fixed spacing, but could as well be implemented as a repeating array of small position offsets (phase shifts) applied to a completely random two-dimensional noise pattern. In this case, a highly visible interference pattern is produced by superimposing two component patterns that appear to be just random noise (like "snow" in a television image). Another example is to use identical fundamental frequencies for each pattern, so that there is no visible moiré beat pattern (within the length of the sensor), and to generate the interference effect by modulating one of the fundamental patterns with a large embedded symbol whose size, shape and repetition are independent design factors used to produce an optimized custom interference effect. Such methods are disclosed in U.S. Pat. No. 6,164,847 entitled "Imaging Parameter Detection", issued on Dec. 26, 2000 to Roy Allen and U.S. Pat. No. 6,022,154 entitled "Image Position Error Detection Technique Using Parallel Lines and Embedded Symbols to Alert an Operator of a Mis-Registration Event", issued to Roy Allen on Feb. 8, 2000.

The advantages of being able to independently select gain, wavelength and fundamental pattern resolutions for the interference effect include: 1) providing a higher gain for given wavelength than a moiré line pattern method allows so that the pitch or wavelength of the interference effect can fit on smaller sensor geometry without compromise of gain and 2) achieving a higher gain with more coarse fundamental patterns than a moiré line pattern method so that implementation of the fundamental patterns on a substrate, by printing for example, is easier and less expensive.

Figure 3:
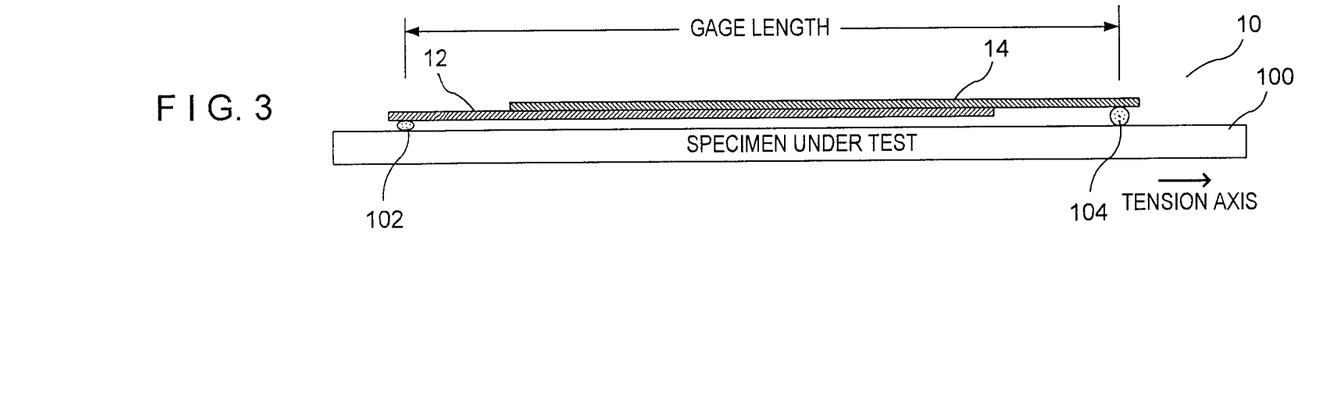
FIG. 3 is a side view of the optical strain gauge of the present disclosure, showing the top and bottom layers.
Figure 6:
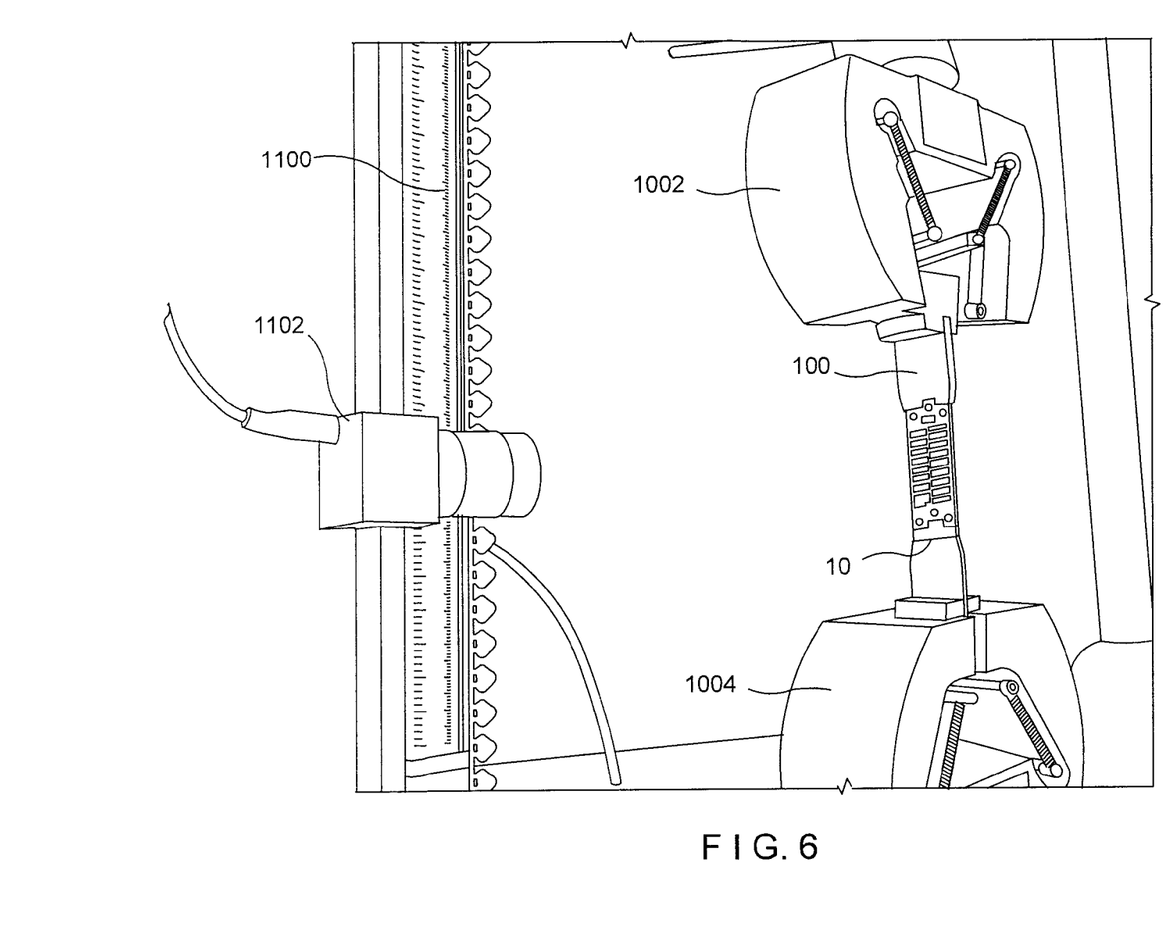
FIG. 6 is a close-up view of the optical sensor receiving an image from the strain gauge of the present disclosure, during tensile testing.
Figure 7:
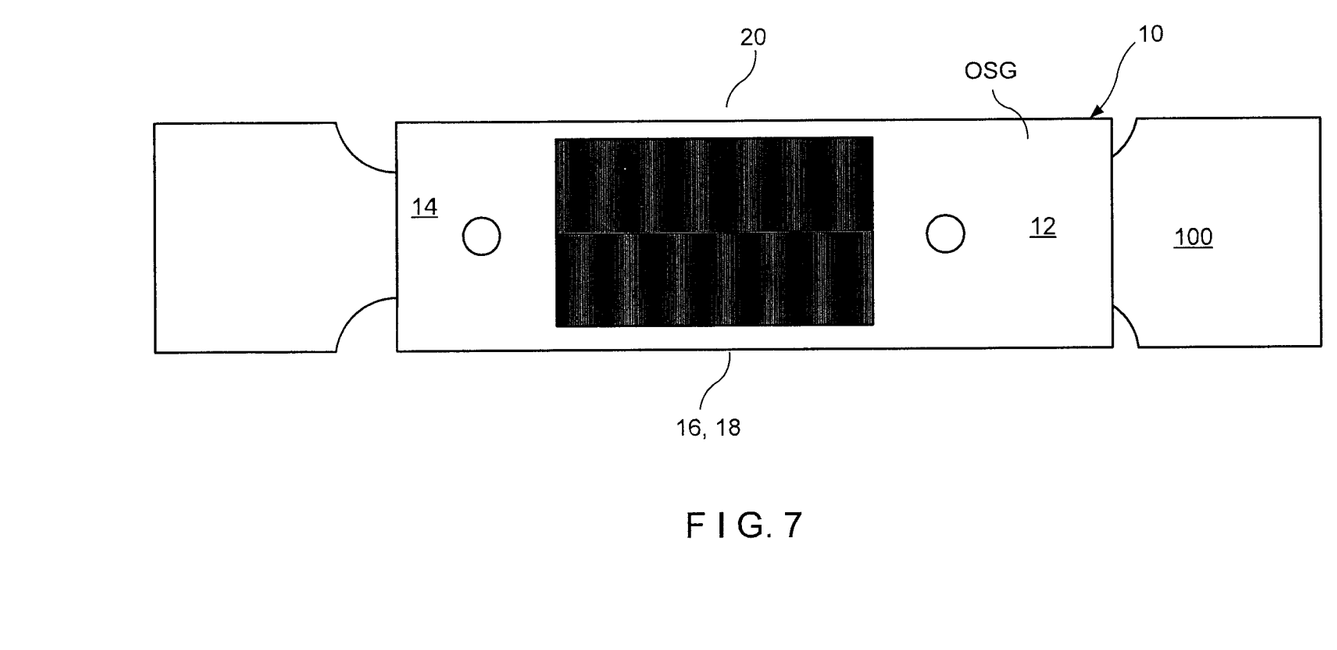
FIG. 7 is a perspective view of the optical strain gauge of the present disclosure attached to a tensile testing specimen.
Figure 15:
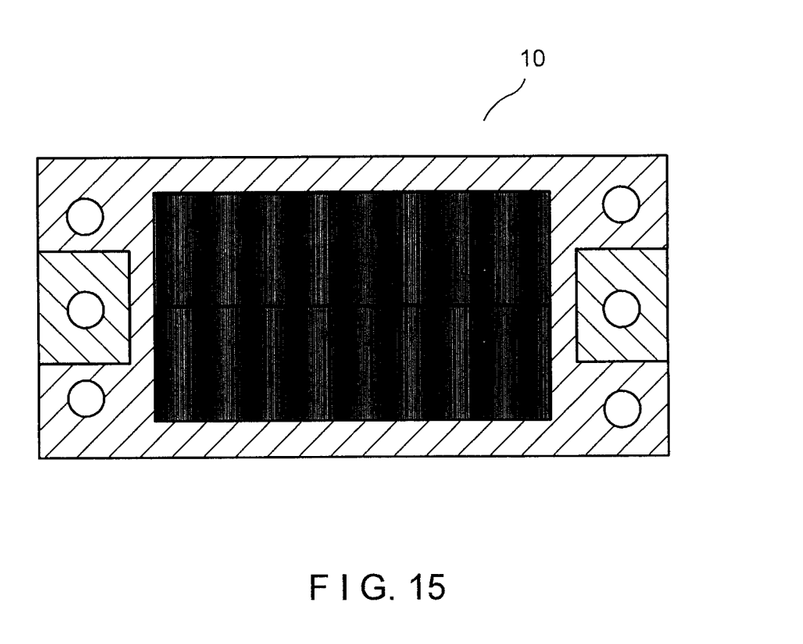
FIG. 15 is an image of the sensor of the present disclosure.

As shown in FIG. 3, with reference to FIGS. 7 and 15, the bottom layer 12 is attached to the tensile testing specimen 100 at a first end 102 of optical strain gauge while the top layer 14 is attached to the tensile testing specimen 100 at a second end 104 of optical strain gauge 100. The attachment is typically done by adhesive, but may be done by other methods, such as, but not limited to, magnetic attachment. The unstrained gauge length is the distance between the attachments at first and second ends 102, 104. Any strain applied will change the gauge length and cause the relative axial movement between the bottom and top layers 12, 14. In this configuration, strain on tensile testing specimen 100 would be induced by the tensile testing apparatus 1000 of FIGS. 5 and 6.

Figure 4:
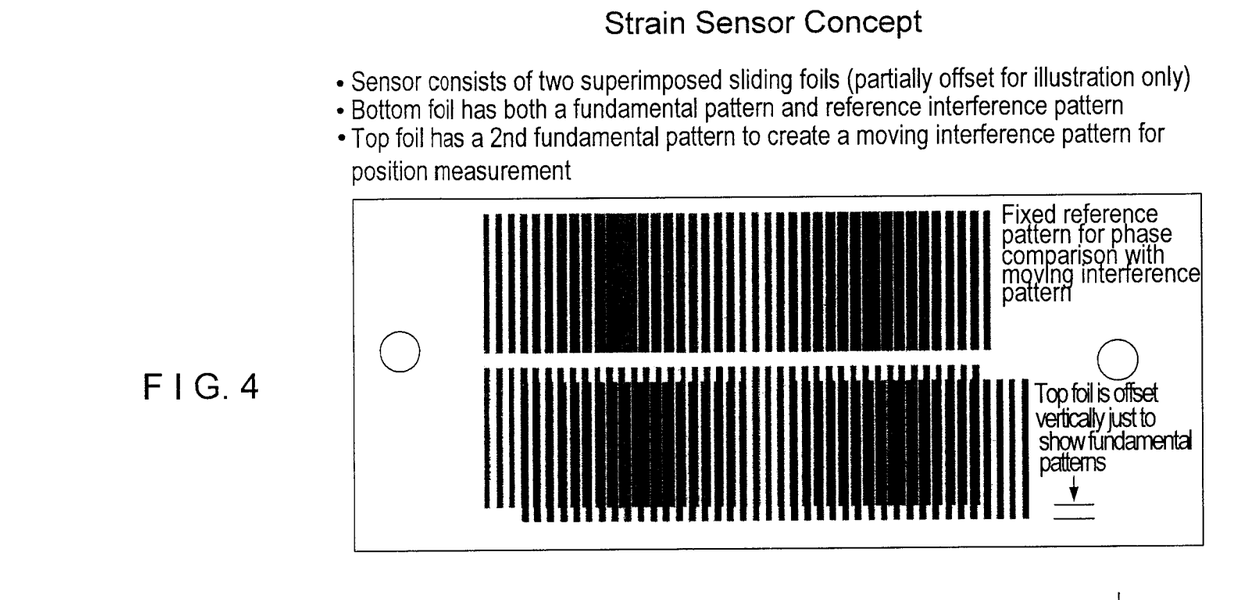
FIG. 4 is a conceptual view of the patterns of the top and bottom layers of the present disclosure causing a moiré pattern, with, for purposes of illustration a slight offset of the patterns of the first and second fundamental frequencies of the moiré pattern.

As shown in FIG. 2, bottom layer 12 further includes a third pattern area 20 with a fixed (or static over time) moiré pattern generated by superimposing a fixed pattern of the first fundamental frequency over a fixed pattern of the second fundamental frequency. As illustrated in FIG. 4, this results in a fixed or reference moiré pattern of sinusoidal intensity (a static pattern with fixed wavelength and spatial phase) at third pattern area 20 which is adjacent to the overlaying of first and second pattern areas 16, 18 wherein a moiré pattern of varying spatial phase, but constant wavelength, is generated. As will be explained in detail, the fixed reference pattern of third pattern area 20 simplifies and improves the accuracy of the image processing for determining the spatial phase change of the pattern generated by the overlaying of the first and second pattern areas 16, 18 (i.e., the amplification of the relative axial displacement between the bottom and top layers 12, 14) and thereby determining the strain of the tensile testing specimen 100.

Additionally, there are several alternatives for generating a reference pattern in lieu of third pattern area 20 including the following alternatives. Firstly, one of the fundamental active patterns may be used as a reference. In this alternative, the fundamental component of the active pattern from either one of the overlapped substrates may be used to generate a reference phase. In this case, the fundamental pattern component has to be sufficiently coarse to be resolvable at the remote camera. The advantages of this alternative are that the sensor size can be reduced by approximately half, thereby resulting in spatial efficiencies; the optical paths to the remote camera for reference and active segments are now identical which further minimizes optical path distortion effects; and there is an improvement in isolation from alignment errors as the active and reference segments are no longer offset from one another. Secondly, one of the active fundamental patterns may be modulated with a low frequency reference. This second alternative uses only two fundamental frequencies as in the first alternative embodiment, but has the further advantage that neither fundamental pattern has to be visible to the remote camera. Rather, one of the fundamental patterns is modulated with a low frequency reference pattern. The reference modulation frequency is offset from the frequency of the active moiré pattern. A Fast Fourier Transformation, or a similar algorithm, separates out the active moiré fringe phase data from the reference modulation phase data due to the frequency offset between the two. Thirdly, two counter-propagating active patterns may be used instead of an active pattern and a reference pattern. The primary function of the reference pattern is to eliminate the motion effects of the remote camera motion and rigid body motion of the local sensor so that all that is measured is the position change of the two physical contact points on the local sensor. Using two counter-propagating active fringe patterns without any static reference pattern can also accomplish this if the patterns move proportionately in opposite directions for a given gauge length change and have the same gain, or known gains. An advantage of this alternative approach is that the measurement benefits from the gain of both active patterns so that the overall fringe measurement gain is doubled. Further details regarding the embedding of a reference pattern are provided hereinafter.

As shown in FIG. 1, bottom layer 12 has a first pair of target dots 22, 24 and a second pair of target dots 26, 28. Top layer 14 has a first target dot 30 which is initially positioned between target dots 22, 24 and a second target dot 32 which is initially positioned between second pair of target dots 26, 28. This may provide a target area for the image processing. In some embodiments, it may provide video targets for measuring very large strains or position displacements beyond the range of overlap between the top and bottom layers 12, 14.

Figure 5:
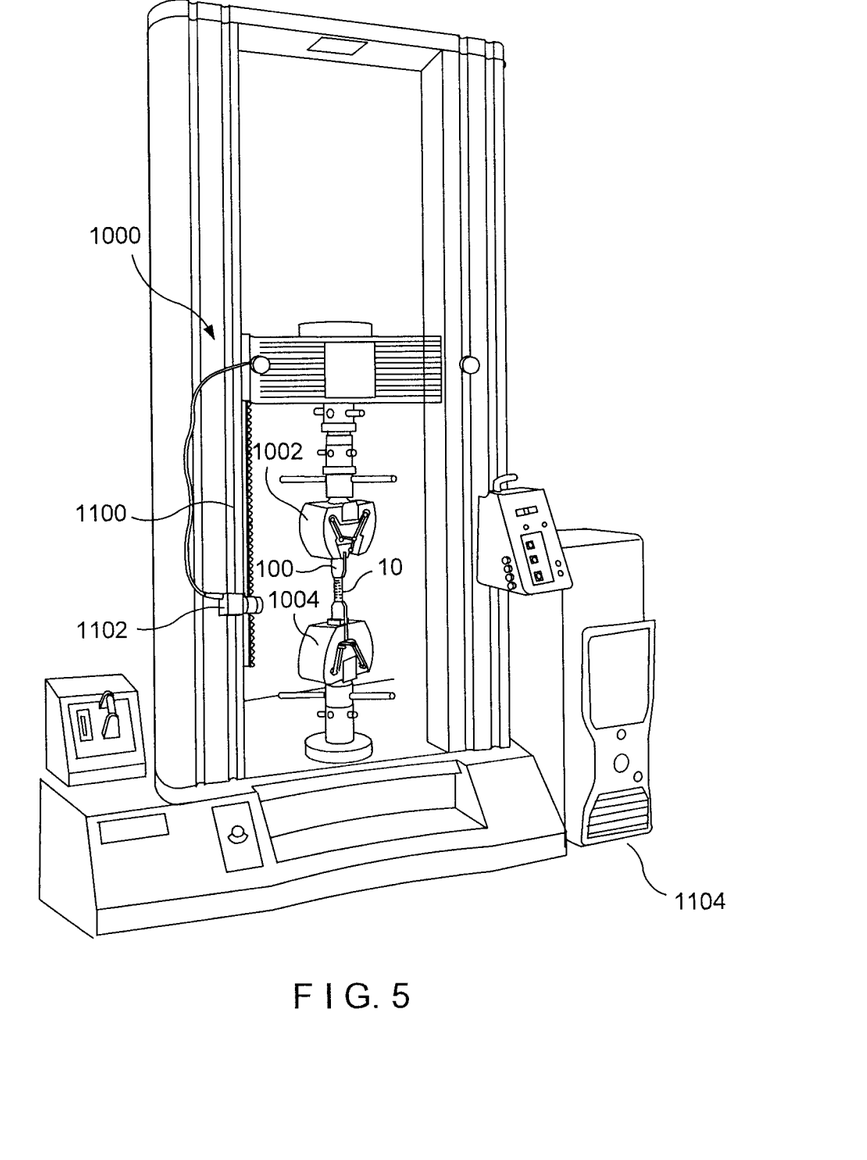
FIG. 5 is a perspective view of the system for tensile strain measurement of the present disclosure.

As shown in FIGS. 5, 6 and 7, the tensile testing specimen 100, with optical strain gauge 10 attached is engaged by jaws 1002, 1004 of tensile testing apparatus 1000. A load is applied to tensile testing specimen 100 (thereby resulting in stress) and measured. Simultaneously, the optical strain gauge 10 is illuminated by LED bank 1100 (or similar apparatus) while remote viewing camera 1102 generates an image of optical strain gauge 10 and the moiré pattern generated by the overlaying of first and second pattern areas 16, 18, as well as the reference moiré pattern of third pattern area 20, and feeds the resulting image to computer 1104 for signal processing to determine the change in gauge length, and therefore the strain, correlated to stress, of the sample 100 undergoing testing.

Some applications may substitute a still camera, the human eye, a linear photo-sensor array, or even a satellite camera, for the illustrated remote viewing camera 1102.

Figure 8:
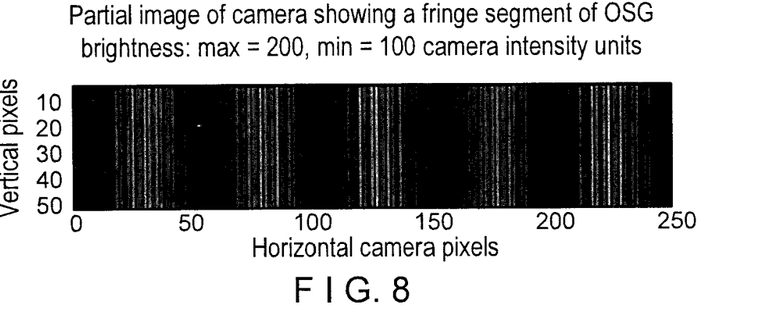
FIG. 8 is a partial camera image showing a fringe segment of optical strain gauge brightness.
Figure 9:
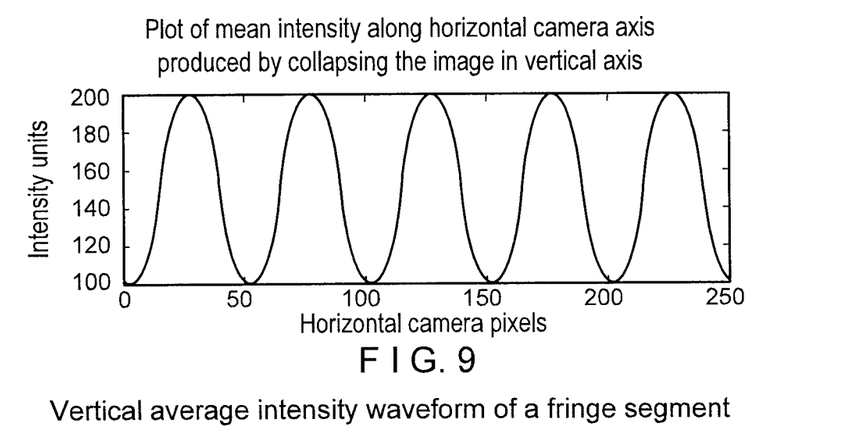
FIG. 9 is a plot of mean intensity along the camera axis produced by collapsing the image of FIG. 8 in the vertical axis.
Figure 10:
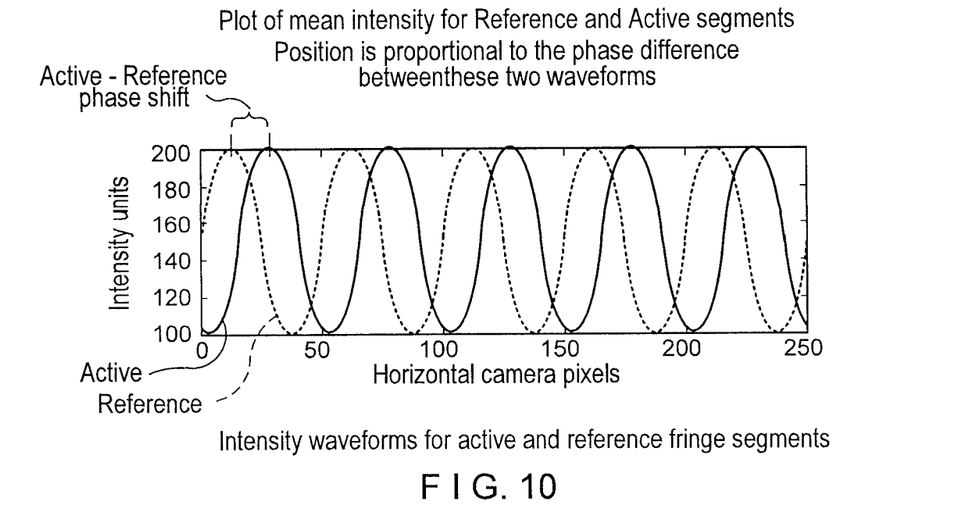
FIG. 10 is a plot of mean intensity for the reference and active segments along the camera axis produced by collapsing the image in the vertical axis.

The image processing is explained with reference to FIGS. 8-14B. FIG. 8 shows a fringe segment of optical sensor brightness, as detected from the third pattern area 20 which provides the static reference. In this and following examples, each vertical pixel has a brightness number which ranges from a maximum of 200 to a minimum of 100 (in this example, specifically chosen to fall within the range of 0-255 (as achieved by 8 bits of data) as may be available as the grey scale in many video applications). When the image is collapsed along the vertical axis (for example, adding together the value of the 50 vertical pixels, see the left hand axis of FIG. 8, and dividing the resulting sum by 50), a linear plot of mean intensity of the reference intensity is obtained as shown in FIG. 9. When the reference intensity is compared to a similar curve derived from the active moiré pattern generated by the overlay of first and second pattern areas 16, 18, a phase shift (see FIG. 10) can be determined by applying a Fast Fourier Transform (FFT) or similar methods to both curves (for example, quadrature-based, 4-phase processing may be used), and therefore the change in gauge length, and therefore the strain, can be determined. The phase difference between the patterns will increase as the specimen contact points (gauge length, see elements 102, 104 of FIG. 3) move further apart. Rigid body motions, such as whole specimen movement or camera vibration, will impart identical phase shifts to both waveforms and will not contribute to the differential phase measurement. The phase difference between the patterns correlates to the strain in the specimen 100. Additionally, the image processing must analyze and compare successive images of the optical strain gauge in order to determine if a phase shift of greater than 360 degrees has occurred (phase unwrapping). Other methods may be used to resolve phase ambiguity.

In another embodiment of the disclosure, the system is configured to provide accurate strain measurement beyond the point of specimen extension where the substrates are overlaid. In this mode of operation, strain measurement is based on the fringe patterns as long as there is sufficient substrate overlap, then switches to calculating strain based on alternative optical strain gauge features such as dots 22, 24, 26, 28, 30, 32.

An embodiment providing enhanced absolute scale measurements is achieved when one or more of the patterns (fundamental frequencies or reference pattern) can be implemented at high accuracy by lithography methods, for example, such that its pitch becomes a known spatial reference from which to apply a dimensional scale to the relative position measurements made by the sensor viewing device. Processing the phase shift information by Fourier methods, for example, has the benefit of also providing highly accurate real-time measurements of the various pattern pitches that are visible to the camera. The phase image processing, which operates in camera pixel space, provides highly precise relative measurements in units of camera pixels, suitable for many applications such as strain measurement. Applications where it is necessary to convert the relative phase measurements to absolute position values requires use of a known, detectable pitch in the viewable patterns that is precisely measured in camera pixel space. The use of a pre-calibrated feature (dimensional scale reference) placed somewhere in the two foils provides this calibration factor. It is preferable that the scale reference feature be measured in the same manner as the phase measurements, therefore comprising a repetitive pattern component that can provide a mean pitch averaged over several cycles at the foil plane of the sensor.

Alternatively, the pattern that will be used for dimensional scale reference can be produced with a more relaxed absolute scale tolerance and then be accurately measured as a final step in the production process to record a calibrated pitch value for the given sensor component. This calibration value itself can be encoded into the pattern on the foil, for example by use of a coarse bar code that is printed at the periphery of the interference pattern so that it can be read remotely by the camera. Thereby providing a physical absolute scale reference and a calibration factor for that reference (if necessary) directly to the camera in every image.

The image processing algorithm maintains absolute scale accuracy independent of camera distortions due to lens vibrations, air current effects and view perspective by virtue of dynamically tracking changes to the measured pitch of the dimensional scale reference and assuming the actual pitch at the sensor to be constant. For example, if the camera were to tilt with respect to the gage length axis it would cause the measured pitch value to be reduced. But this is compensated for by assuming the pitch change is artificial and compensating measurement accordingly. Actual sensor pitch changes, such as those due to thermal expansion, are typically orders of magnitude smaller than those induced by camera rotation.

Figure 11A:
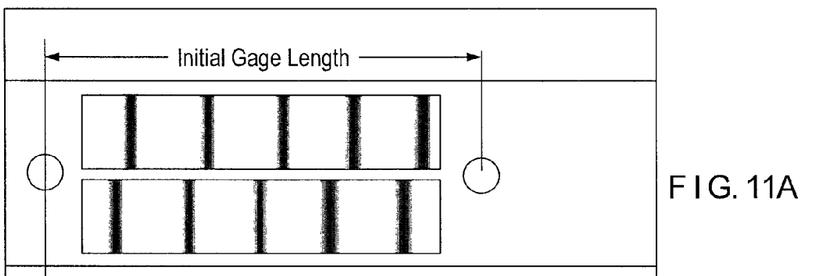
FIGS. 11A, 11B and 11C are fixed segments of successive video frames showing effects of rigid body and strain displacements on the optical strain gauge of the present disclosure.
Figure 11B:
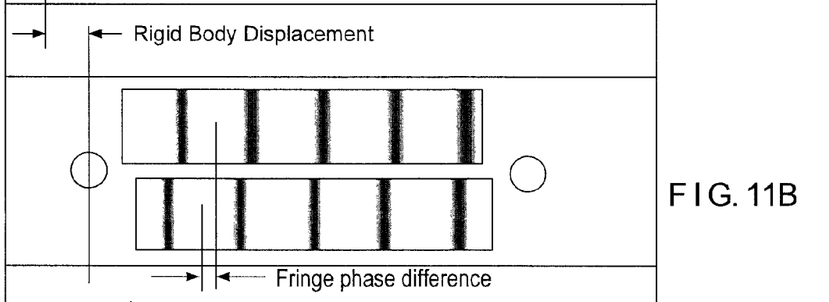
Figure 11C:
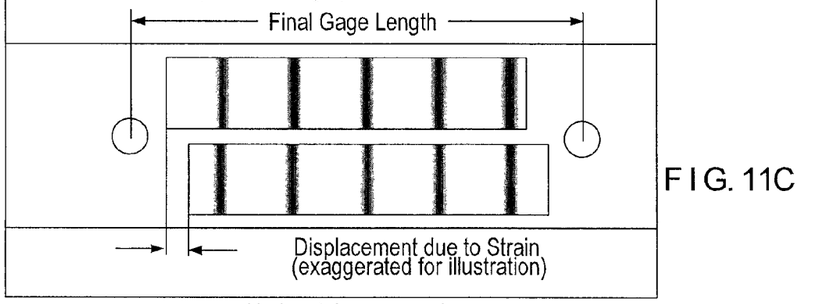

An example sequence of three video frames is shown in FIGS. 11A, 11B and 11C. This shows a fixed segment (for example 110 by 400 pixels) of a video frame as the OSG sensor image moves through it. The dots 103, 105 are designed to coincide with the points of physical contact of the ends 102, 104 to the specimen as shown in FIG. 3. This defines a gauge length. Two forms of motion are evident. There is horizontal rigid body displacement of the whole optical strain gauge 10 due to specimen movement relative to the camera (not shown in these figures). This rigid body movement or common-mode movement is not due to strain and must therefore be eliminated from affecting the strain measurement. The role of the reference pattern 20 is to track this motion so that it can be removed from the phase measurement. The other form of motion is the extension of the specimen contact points (as indicated by dots 103, 105) and therefore the gauge length, due to tensile forces being applied to the specimen 100 (see FIG. 3) making it stretch under load. The strain intended to be measured is only that which is picked up by the dots 103, 105 (corresponding to the specimen contact points). Other strain effects may occur over the length of the specimen (depending upon the material) which do not affect the strain between the contact points. Rigid body motion is removed by use of the reference pattern 20 and does not affect the end results. Because rigid body motion will affect the foils in the same way, the rigid body motion can be accounted for by making measurements relative to the position of the reference pattern in each video frame. Rigid body motion is dynamic and can change with every video frame just as strain motion can (see FIGS. 12A, 12B, 13A, 13B, 14A and 14B). Therefore, rigid body motion has to be determined and measured for each video frame and removed from the measurement of strain-induced motion, so that the results are not skewed. This is facilitated by the reference pattern 20. The displacement due to strain is greatly exaggerated in these figures for the purposes of illustration. As the overlapped foils independently follow the motion of the dots 103, 105, the differential strain motion causes the active and reference area to separate as shown. The phase of the active fringe pattern, comprising interference between top and bottom foils (and illustrated as elements 16, 18) moves proportionately to the increase in gauge length but with an optical magnification factor due to the moiré effect so that a much larger fringe phase shift (fringe waveform translation) is induced. The optical magnification factor is defined as the ratio of fringe waveform translation to the physical translation between the two foils, with both expressed in the same linear dimension units. The frame-to-frame changes to the phase difference between the active and reference fringe patterns (shown in FIGS. 11A-11C) captures this magnified strain displacement independent of the rigid body motions of the camera and the optical strain gauge.

Figure 12A:
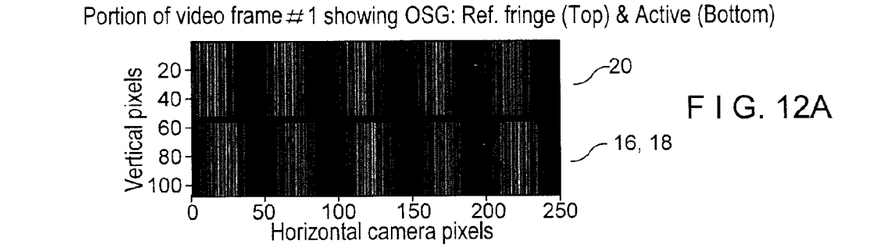
FIGS. 12A-12B, 13A-13B, 14A-14B are three pairs of drawings illustrating portions of video frames from the optical strain gauge with reference and active fringe patterns and the corresponding plots of mean intensity for the reference and active segments.
Figure 12B:
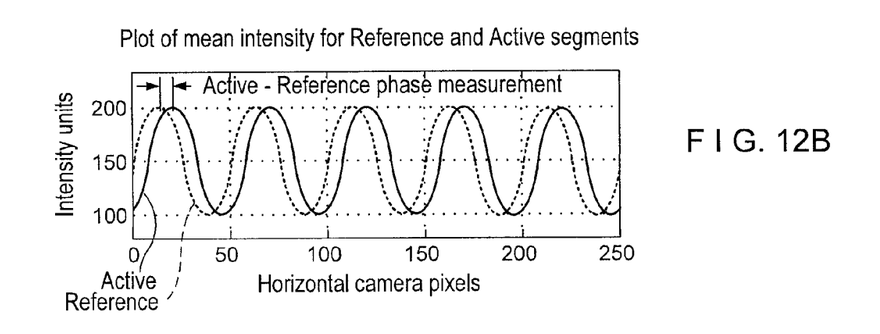

Another example of three consecutive video frames is shown in FIGS. 12A and 12B; FIGS. 13A and 13B and FIGS. 14A and 14B. The image segment shown is a fixed window into the whole video frame, illustrated as just large enough to capture a significant portion of the overlapping segment of the OSG fringe patterns. Each frame corresponds to a different point in time sequence as the specimen is stretched under tensile load. The initial video frame in FIG. 12A is a 110×250 camera pixel segment, containing a 50×250 pixel segment of each fringe pattern. The patterns are collapsed vertically to produce the horizontal intensity waveforms shown in FIG. 12B for the active and reference fringe patterns. The phase shift between the two waveforms is measured by any number of methods, including, but not limited to, Fast Fourier Transform, to produce a differential phase measurement for that particular frame. The phase shift essentially corresponds to the spacing offset between the peaks of the waveforms of the reference and active phases. Assuming that FIG. 12A is representative of the start of the test, then this differential phase measurement is used to establish the initial offset relationship between the fringe patterns that correlates to zero strain, as the load is zero at the start of the test.

Figure 13A:
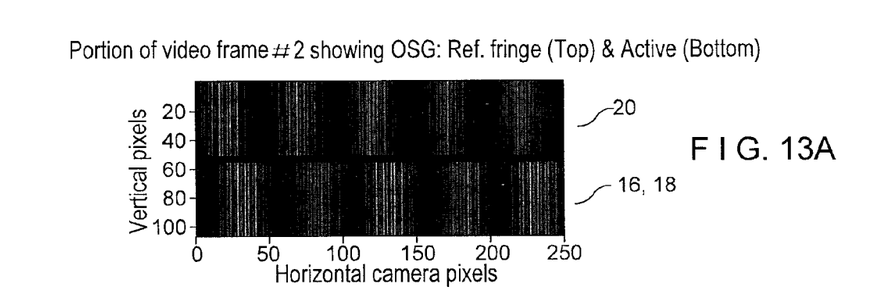
Figure 13B:
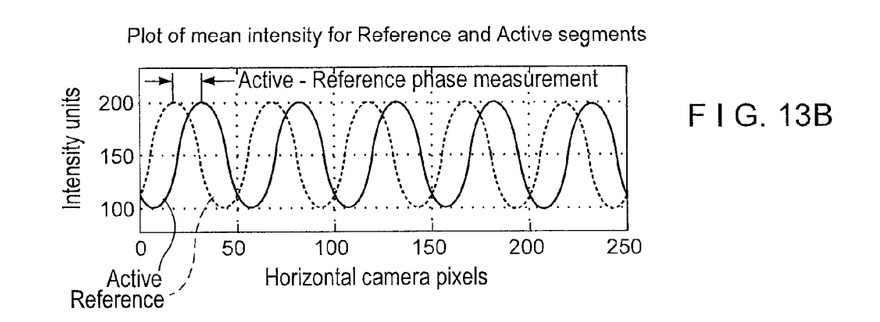

At the next measurement time interval, the video frame of FIG. 13A and the corresponding plot of FIG. 13B show that there are components of both rigid body motion and strain induced motion indicated in the phase positions of the two patterns. The reference pattern has shifted slightly due to rigid body motion from where it was in FIG. 12A. Additionally, the active pattern has shifted away from the reference pattern phase by a larger amount than in FIG. 12A. This subsequent phase shift indicates that there has been strain induced movement due to a slight increase in the specimen gauge length at FIG. 13A. This gauge increase at FIGS. 13A and 13B is calculated as:

Initial Offset=active minus reference phase of FIG. 12A at start of test

Current Phase Offset=active minus reference phase of FIG. 13A at first time interval Strain Phase Shift=Current Phase Offset minus Initial Offset Gauge Change=Strain Phase Shift times Phase-to-Position Calibration Factor The Phase-to-Position Calibration Factor of the sensor is established by the design of the moiré patterns used for the sensor that define both a moiré gain factor and a fringe wavelength (pitch). It is essentially the ratio of the moiré interference pitch in position units (such as millimeters) at the surface of the optical strain gauge to the moiré gain which is unit-less. Since these design features are known they can be used by the processing algorithm to provide a Phase-to-Position Calibration Factor to sufficient accuracy for high resolution strain measurement. This is because strain is a relative measurement from a starting point that is defined as having zero strain and therefore does not require absolute position measurements beyond the zero strain point. Furthermore, the gage length measurement at the zero strain point typically only requires an absolute accuracy of 0.5%. However, if necessary to further enhance absolute measurement accuracy, one or both of these moiré design features can be measured as a last production step in the manufacture of the optical strain gauge to provide high accuracy unique values for each production unit. These moiré design features are typically proportionately related therefore any potential variations in moiré gain can be accurately determined by keeping track of the fringe pitch. Also, in order to make remote measurements that are independent of camera movements and orientation, the pitch of the reference waveform is tracked. An alternative embodiment of the Phase-to-Position Calibration Factor is to use the pre-measured pitch of this reference waveform as an absolute position scale reference.

The pitch of the reference pattern is known and provided during creation of the reference pattern. This pitch is then re-measured in the pixel space of every video frame to establish the camera interpretation of the reference pitch, roughly 50 pixels as shown in FIGS. 13A and 13B. This camera pitch is the spacing between the peaks of the reference waveform. Finally, the Strain Phase Shift measurements can be expressed as a ratio of this current video pitch measurement. A gain factor for each video frame is established by calculating the ratio of the known calibrated pitch at the pattern of the surface of the optical strain gauge to the video frame measurement of the same pitch. This gain factor, or the Phase-to-Position Calibration Factor, can then be used to convert phase measurements in camera pixel space to position units at the surface of the optical strain sensor. In this manner, pixel shifts of a fringe pattern phase in the video frame can be directly converted into physical position shifts at the surface of the optical strain gauge.

Because the Strain Phase Shift is typically expressed in pixels and the Phase-to-Position Calibration Factor is typically expressed as millimeters per pixel, Gauge Change becomes a unit of measure, such as millimeters, or the amount of distance moved. The objective is to measure the movement of the noted points. For strain measurement, these units do not necessarily need to be calibrated into physical position units and can remain as a ratio metric relative to a defined starting position.

The gain factor could possibly change in each frame. Therefore, there may be a need to determine the gain factor for each frame. But, typically, the gain factor will stay constant or change only slightly. In a noisy system with, for example, unwanted camera motions, this factor could change slightly on a frame-to-frame basis. Moreover, the intent of one embodiment of the optical strain gauge is to be able to provide accurate measurement of small position changes in the presence of very large common-mode motions in three-dimensional space. For example, a disposable optical strain gauge in an adhesive "band-aid" configuration may be placed on a specimen with a complex three dimensional shape (such as, but not limited to, a turbine blade) in which the shape changes dramatically under stress. An ordinary position sensor that is remotely read would quickly move out of the calibrated camera field of view (z-motion). Additionally, an ordinary sensor would require that the camera be held very rigid. Any camera movement in an ordinary sensor would contribute directly to position measurement error. Therefore, applying the frame-to-frame gain factor measurements of some number of frames can also provide a useful advantage, so this is also a possible method of implementation. Also, it should be noted that multiple optical strain gauges can be used simultaneously to measure various items. To this end, the determination of the Gauge Change provides the desired result.

Figure 14A:
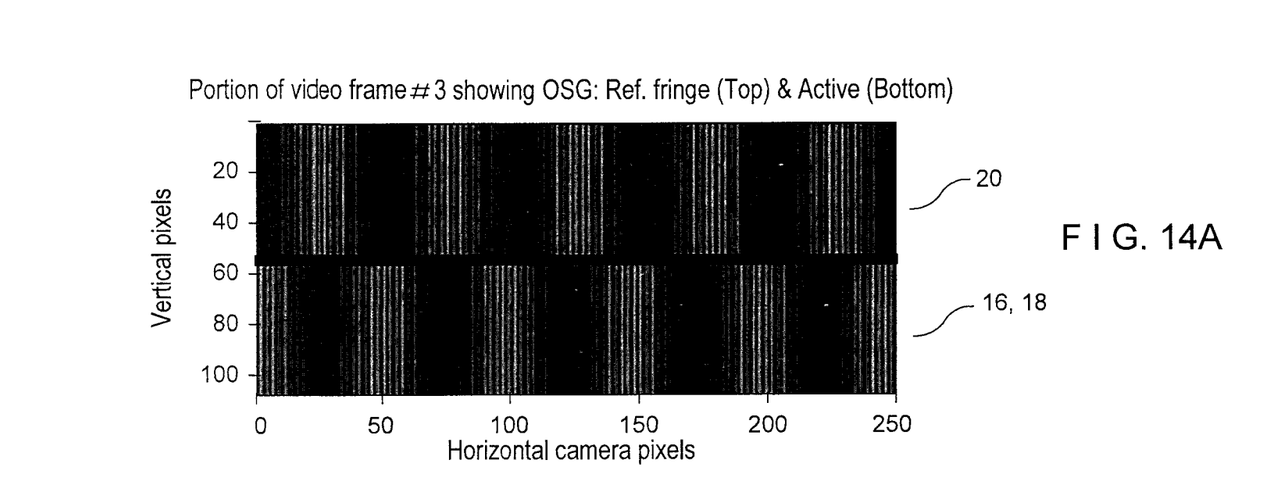
Figure 14B:
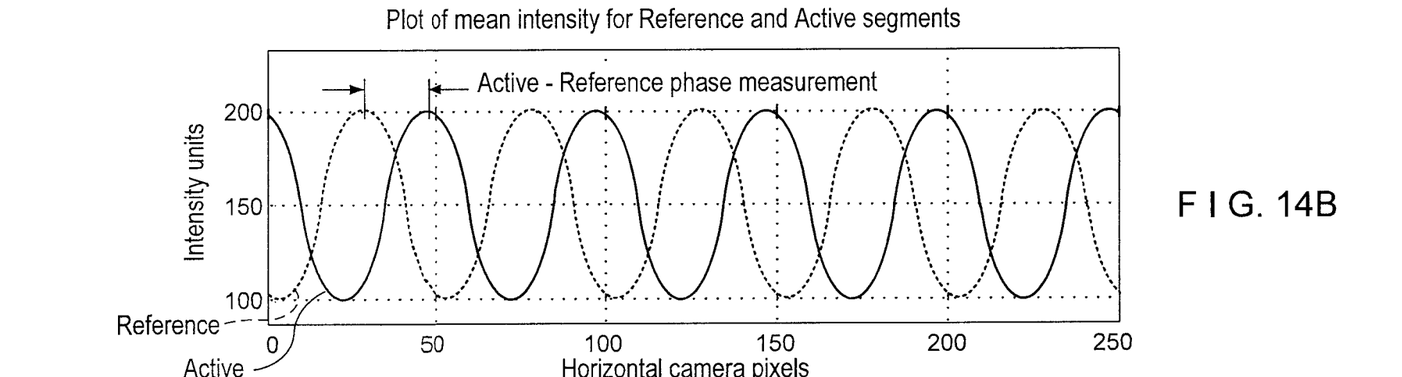

FIG. 14A shows a third video frame taken at a second time interval and likewise processed obtaining FIG. 14B to produce a measurement of gauge change at the surface of the optical strain gauge. The subsequent differential phase measurement between the active and reference fringe patterns is larger than that shown in FIGS. 13A and 13B thereby indicating that the strain is continuing to increase. Additionally, there is a rigid body component of motion as indicated by the additional shift of the reference pattern over its position in FIG. 13B. The strain-induced gauge increase at FIGS. 14A and 14B is calculated as:

Initial Offset=active minus reference phase of FIG. 12A at start of test

Current Phase Offset=active minus reference phase of FIG. 14A at second time interval Strain Phase Shift=Current Phase Offset minus Initial Offset Gauge Change=Strain Phase Shift times Phase-to-Position Calibration Factor Similar video processing is performed for each video frame in sequence thereby producing an array of strain measurements at designated time intervals.

Additionally, a typical embodiment of the optical strain gauge measures a very small movement (i.e., the change in gauge length during tensile testing) in comparison to the total distance between the specimen and the remote viewing camera 1102 (see FIGS. 5 and 6). For instance, notably, the ratio of working distance to accuracy may, in some embodiments, be as high as ten million to one. Moreover, the embodiment allows for sub-pixel interpolation—accurate measurements in camera pixel space that are actually smaller than the individual pixels of the remote viewing camera 1102 by, for example, a factor of up to 1000 or more. A pixel is the smallest light gathering element in the camera. The active interference pattern magnifies the motion and provides a readily viewable image to determine motion. In this embodiment, a small image (for example, 50 pixels out of a 1000 pixel camera FOV length) may be used to make a measurement that in actuality moves only over a tiny portion of a single pixel diameter. In one example of an embodiment, a remote camera provides a 500 millimeter field-of-view over an image length of 1000 camera pixels. A small scale sensor at the image plane is used that presented only a 50 pixel long image in the camera space. This low pixel resolution image of the sensor can make an accurate position measurement even when the foil physically moves by only a tiny fraction of a single camera pixel length. This embodiment typically resolves position to better than 0.25 microns using the 50 pixel segment to produce an accurate sub-pixel resolution factor of 2000:1. The large 500 millimeter field-of-view allows for large common-mode motions of the sensor. Alternately, the large field-of-view may be used to view multiple sensors in a single camera field-of-view.

The high optical gain of the moiré interference effect can be used to provide a combination of the following enhancements—increased accuracy of position displacement, increased camera FOV (measurement range), reduced camera resolution requirements (lower costs); increased distance between the remote viewing camera 1102 and the specimen (working distance). This is due to the remote viewing camera 1102 taking an image, not a measurement. This is due to the measurement being established locally to the specimen, by virtue of the given state of the interference patterns and that they have gain, which eliminates the need to involve the physical coordinate space of the remote camera. The remote viewing camera therefore only makes a relative fringe comparison at each video frame (an interpretation from its viewing perspective at a given moment) rather than a physical measurement. This likewise results in a very high signal to noise ratio which is not susceptible to outside physical factors. The desired calculation or measurement is obtained by analyzing the image, thereby eliminating or reducing many of the deficiencies of the prior art. The camera pixel resolution needs to be sufficient only to resolve the interference pattern for the Fast Fourier Transformation. The remote viewing camera 1102 does not need to detect the finer patterns that comprise the moiré interference, so it can be a lower resolution camera than if it had to track fine image features such as is necessary for other cameras or metrology methods. A characteristic of causing the magnified interference effect to take place locally to the specimen is that the critical measurement is established locally by the phase relationship of these patterns and is therefore not distorted by the usual positional and optical instabilities in the coordinate space beyond the optical strain gauge and the specimen. In other words, the measurement is made at the plane of the optical strain gauge 10. The video camera needs only to interpret relative pattern changes that are one or two orders of magnitude more coarse than actual measurement resolution.

There are many variations for the above disclosure. While the remote displacement sensor has been illustrated as an optical strain gauge, different embodiments using the same fundamental principles may include a remote displacement sensor which is to measure movement of the earth's crust around earthquake faults. The sensor may be read locally, remotely, or even periodically by a satellite camera. Similarly, the remote displacement sensor may monitor movements, which may include strain-inducing movements, on bridges or other structures, which likewise may be monitored locally, remotely, or even periodically by a satellite camera. The remote displacement sensor may be implemented on a smaller scale to monitor position changes, which may include strain inducing movements, on a computer chip or similar small and/or delicate device, particularly during wafer processing, optical component sub-assembly manufacturing and the like.

As described previously, other variations may include the embedding of the reference pattern into one of the fundamental patterns that comprise the active moiré fringe segment. In this method, one foil or substrate will contain both the fundamental frequency (Frequency 1) of the moiré pair and an additional intensity modulation component having a different frequency (Frequency 3=Reference waveform). The other foil or substrate will contain the second fundamental frequency of the active moiré pair (Frequency 2). The result is a slightly more complex fringe pattern that produces both a moving fringe pattern with optical magnification and a static reference pattern that follows the motion of one of the foils or substrates. This provides the same functionary as the separate reference pattern as described in other embodiments. Fourier transformation is one of the possible method used to isolate the two fringe frequencies from the active interference waveform. The reference frequency (Frequency 3) in this case may be different from the frequency of the active fringe (Moiré Frequency). The phase comparison will be between the Fast Fourier phase measurement of the reference component (Frequency 3) and the moiré frequency component (Moiré Frequency). The phase measurement of Frequency 3 has to be scaled by the ratio of the two frequencies (Frequency 3 and the Moiré frequency) before the comparison is made. This embedding of the reference typically results in only one fringe area to evaluate in the camera field-of-view thereby allowing for reduction in size in the sensor; allowing for processing of the reference and active patterns in identical optical image environments; and reducing the processing time as there is only one fringe segment to process.

Additionally, in some applications, embodiments of the strain gauge 10 may be used as a direct replacement for a traditional planar strain gauge, providing a small, inexpensive disposable micro-position transducer that is in the form of a thin, passive device. Therefore, it can be applied in many of the same applications (such as, but not limited to, pressure or temperature measurements) as a traditional strain gauge but typically requires no wires, local preamplifier or delicate boding to a specimen surface, and typically has orders of magnitude greater measurement range.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. An optical displacement measuring device, comprising:
   a first substrate including a first area with a first pattern formed on the first substrate;
   a second substrate including a second area with a second pattern formed on the second substrate;
   the first or second substrate including a fixed reference pattern;
   the second substrate overlying the first substrate whereby the second pattern overlies the first pattern and the first and second patterns generate a pattern of modulated intensity which is compared to the fixed reference pattern for determining relative movement of the first and second substrates with respect to each other;
   wherein the first substrate is attached to a surface at a first connection point and the second substrate is attached to a surface at a second connection point; and
   a distance between the first and second connection points define a gauge length, and changes in the gauge length cause a phase shift of the pattern of modulated intensity with respect to the fixed reference pattern.

2. The optical displacement measuring device of claim 1 wherein the first pattern includes a first fundamental moiré frequency, the second pattern includes a second fundamental moiré frequency and the pattern of modulated intensity is a moiré pattern.

3. The optical displacement measuring device of claim 2 wherein the moiré pattern has a sinusoidal intensity pattern with a wavelength determined by the first and second fundamental moiré frequencies.

4. The optical displacement measuring device of claim 3 wherein the first and second patterns are patterns of parallel lines, spaced according to the respective first and second fundamental moiré frequencies.

5. The optical displacement measuring device of claim 3 wherein the fixed reference pattern is formed from the first and second fundamental moiré frequencies in a fixed relationship.

6. The optical displacement measuring device of claim 1 wherein the fixed reference pattern is static over time.

7. The optical displacement measuring device of claim 6 wherein the fixed reference pattern is formed adjacent to an overlay of the first area with the first pattern and the second area with the second pattern.

8. The optical displacement measuring device of claim 7 wherein the change in phase of the moiré pattern causes a translation of the moiré pattern which is proportional to, and greater than, the change in gauge length.

9. The optical displacement measuring device of claim 8 wherein the translation of the moiré pattern is at least 20 times the change in gauge length.

10. The optical displacement measuring device of claim 1 wherein an image of the optical displacement measuring device is captured by a camera.

11. The optical displacement measuring device of claim 10 wherein the image of the optical displacement measuring device is collapsed into a first linear plot of intensity for the moiré pattern and a second linear plot of intensity for the fixed reference pattern.

12. The optical displacement measuring device of claim 11 wherein the first and second linear plots of intensity are analyzed by a Fast Fourier Transform algorithm, thereby determining a phase change of the first linear plot of intensity in response to change in gauge length.

13. The optical displacement measuring device of claim 1 wherein at least one of the first and second substrates include visual targets for tracking for further calculation of change in gauge length.

14. A process for measuring displacement comprising:
   providing a sensor, the sensor including a first substrate with a first area of a first pattern formed on the first substrate and a second substrate with a second area of a second pattern formed on the second substrate, whereby overlaying of the second pattern on the first pattern generates a pattern of modulated intensity, the first or second substrate further including a fixed reference pattern;
   attaching the first substrate to a first point on a specimen and attaching a second substrate to a second point on a specimen, thereby defining a gauge length between the first and second points on the specimen;
   measuring an initial comparison of the pattern of modulated intensity and the fixed reference pattern;
   causing a change in the gauge length thereby changing the pattern of modulated intensity;
   measuring a subsequent comparison between the pattern of modulated intensity and the fixed reference pattern; and
   calculating the change in gauge length based on the initial comparison and the subsequent comparison.

15. The process of claim 14 wherein the first pattern includes a first fundamental moiré frequency, the second pattern includes a second fundamental moiré frequency and the pattern of modulated intensity is a moiré pattern.

16. The process of claim 15 wherein the moiré pattern has a sinusoidal intensity pattern with a wavelength determined by the first and second fundamental moiré frequencies.

17. The process of claim 16 wherein the first and second patterns are patterns of parallel lines, spaced according to the respective first and second fundamental moiré frequencies.

18. The process of claim 16 wherein the fixed reference pattern is formed from the first and second fundamental moiré frequencies in a fixed relationship.

19. The process of claim 18 wherein the fixed reference pattern is static over time.

20. The process of claim 19 wherein the fixed reference pattern is formed adjacent to an overlay of the first area with the first pattern and the second area with the second pattern.

21. The process of claim 19 wherein the step of causing a change in the gauge length causes a change in a phase of the moiré pattern.

22. The process of claim 21 wherein the change in phase of the moiré pattern causes a translation of the moiré pattern which is proportional to, and greater than, the change in gauge length.

23. The process of claim 22 wherein the translation of the moiré pattern is at least 20 times the change in gauge length.

24. The process of claim 22 further including the step of capturing an image of the sensor.

25. The process of claim 22 wherein the step of capturing the image of the sensor is performed by a camera.

26. The process of claim 24 further including the step of collapsing the image of the optical displacement measuring device into a first linear plot of intensity for the moiré pattern and a second linear plot of intensity for the fixed reference pattern.

27. The process of claim 26 further including the step of analyzing the first and second linear plots of intensity by a Fast Fourier Transform algorithm, thereby determining a phase change of the first linear plot of intensity in response to change in gauge length.

28. The process of claim 14 further including the step of providing visual targets on at least one of the first and second substrates for further calculation of change in gauge length.

* * * * *